United States Patent [19]
Owen, Jr.

[11] 4,100,354
[45] Jul. 11, 1978

[54] TEREPHTHALATE ESTER POLYOLS

[75] Inventor: Gwilym E. Owen, Jr., Granville, Ohio

[73] Assignee: Owens-Corning Fiberglass Corporation, Toledo, Ohio

[21] Appl. No.: 711,949

[22] Filed: Aug. 5, 1976

[51] Int. Cl.² ............................................. C07C 69/82
[52] U.S. Cl. ..................................... 560/89; 521/172; 521/176; 560/91
[58] Field of Search ................. 260/475 P; 560/89, 91

[56] References Cited
U.S. PATENT DOCUMENTS

| 3,496,220 | 2/1970 | McCarty et al. | 260/475 P |
| 3,907,863 | 9/1975 | Voss | 260/475 P |
| 4,018,815 | 4/1977 | Vogt et al. | 560/89 |

*Primary Examiner*—Jane S. Myers
*Attorney, Agent, or Firm*—Ronald C. Hudgens; Philip R. Cloutier; Dennis M. Kozak

[57] ABSTRACT

Mixtures of glycols, monomers and oligomers are disclosed which mixtures are converted to terephthalate ester polyols. These terephthalate ester polyols are useful in the production of polyurethane foams. When these polyols are employed to produce polyurethane foams, the resulting foams exhibit excellent flame properties.

4 Claims, No Drawings

TEREPHTHALATE ESTER POLYOLS

This invention relates to polyester polyols useful in the production of polyurethane foams.

More specifically, this invention relates to terephthalate ester polyols, produced from mixtures of glycols, monomers and oligomers, which polyols are useful in the production of polyurethane foams.

In one of its more specific aspects, this invention relates to a method of increasing the fire retardancy and decreasing the smoke output under fire conditions of polyurethane foams by incorporating into the foams a terephthalate ester polyol.

Polyurethane foams have found widespread utility in the fields of insulation and structural reinforcement. Accordingly, the foam industry is constantly searching for better and lower costing materials for use in polyurethane foam compositions.

One factor limiting the commercial utilization of polyurethane foams has been their flammability. Numerous fire-retardant materials are available for employment in foam compositions. For example, there are phosphorous-containing or chlorinated polyols which are reactive components. There are also many types of nonreactive fire retardants, such as antimony trioxide. Also, there are materials which act both as fillers and as fire retardants, such as finely ground calcium carbonate and calcium magnesium carbonate.

All the above-mentioned materials are effective as fire retardants. However, they have disadvantages. Some of the disadvantages associated with the use of such fire-retardant materials are that the improved fire-retardant properties which the materials impart are obtained at a premium in cost or with a sacrifice in the mechanical and physical properties of the resulting foams or at a sacrifice in processing ease. Also, the employment of certain fire-retardant materials in a polyol-isocyanate reaction mixture produces toxic combustion products.

The present invention provides terephthalate ester polyols which when incorporated in polyurethane foams avoid the above disadvantages and provide foams having good fire-retardant and good smoke-output properties.

According to this invention, there is provided a terephthalate ester polyol comprising the reaction product of a mixture of glycols, monomers and oligomers and a polyhydric alcohol.

The present invention also provides a polyurethane foam comprising the reaction product of an isocyanate and a terephthalate ester polyol comprising the reaction product of a mixture of glycols, monomers and oligomers and a polyhydric alcohol.

Also, according to the present invention there is provided a method of producing an improved polyurethane foam produced as the reaction product of an isocyanate, which method comprises reacting with the isocyanate a terephthalate ester polyol comprising the reaction product of a mixture of glycols, monomers and oligomers and a polyhydric alcohol.

In one embodiment a terephthalate ester polyol of this invention is employed as the only polyol to produce a polyurethane foam.

In another embodiment a terephthalate ester polyol of this invention is employed with at least one other polyol to produce a polyurethane foam.

Suitable mixtures of glycols, monomers and oligomers for use in this invention include waste streams from processes for the production of linear polyesters from glycols and terephthalic acid.

One particular type of mixture which can be employed in this invention is produced from ethylene glycol and terephthalic acid and will have the following analyses:

| Component | Weight Percent Range |
|---|---|
| ethylene glycol | 0–30 |
| diethylene glycol | 0–10 |
| triethylene glycol | 0–10 |
| tetraethylene glycol | 0–5 |
| ethylene glycol monomer | 12–80 |
| diethylene glycol monomer | 0–15 |
| mixed monomers | 0–15 |
| oligomers | 0–70 |

Mixtures of this type will have a hydroxyl number within the range of from about 130 to about 900 with a preferred range of from about 250 to about 575. They will have an acid number range of from about 5 to about 430 with a preferred range of from about 5 to about 35. The ester portion of each mixture will have a number average molecular weight, as measured by gel permeation chromatography, within the range of from about 150 to about 650 with a preferred range of from about 200 to about 550.

In the above mixtures the monomers and the oligomers can be considered as having the following formulas:

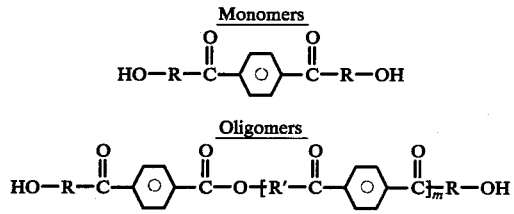

wherein $m$ has a value within the range of from 1 to 3, R represents the group $+CH_2CH_2-O+_n$ and $n$ has a value within the range of from 0 to 4 and R' represents the group $+CH_2CH_2-O+_x$ and $x$ has a value within the range of from 1 to 4.

Mixtures of glycols, monomers and oligomers as described above are commercially available from Eastman Chemical Products, Inc., Kingsport, Tenn. and from E. I. du Pont de Nemours & Co., Wilmington, Del.

A mixture of glycols, monomers and oligomers can be employed directly to produce a foam of this invention. However, it is preferred to react the mixture of glycols, monomers and oligomers with a polyhydric alcohol to produce a terephthalate ester polyol having an average hydroxyl functionality greater than two. When a mixture of glycols, monomers and oligomers is reacted with a polyhydric alcohol, the polyhydric alcohol will be present in an amount within a range of from about 4 to about 1 moles to about 1 to about 4 moles of the mixture of glycols, monomers and oligomers. Preferably, the range will be from about 2 to about 1 moles of polyhydric alcohol to about 1 to about 2 moles of the mixture of glycols, monomers and oligomers.

In the production of a terephthalate ester polyol of the present invention, any suitable polyhydric alcohol can be employed. Particularly suitable polyhydric alcohols include glycerin, trimethylolpropane, triethanolamine, pentaerythritol, oxyalkylated glycerin, oxyalkylated trimethylolpropane, oxyalkylated triethanolamine, oxyalkylated pentaerythritol, mixtures thereof and the like.

A typical procedure for preparing a terephthalate ester polyol of this invention is as follows. The total amounts of the mixture of glycols, monomers and oligomers and of the polyhydric alcohol are added to a reactor at room temperature along with a transesterification catalyst, such as tetrabutyltitanate or magnesium acetate, the latter being present in the amount of about .05 percent by weight of the total weight of the mixture of glycols, monomers and oligomers and the polyhydric alcohol. The contents of the reactor are then heated with stirring under a continuous nitrogen sparge and a vacuum of about 20 to 25 inches Hg. The temperature of the reactor contents is permitted to rise to about 170° C at which temperature vacuum distillation of ethylene glycol begins. The temperature is permitted to rise slowly to about 200° to 250° C or until the free glycols in the mixture of glycols, monomers and oligomers and the glycols resulting as a product of the reaction are distilled over. The resulting product in the reactor is permitted to cool to room temperature and is recovered as a terephthalate ester polyol of this invention. The viscosity of polyols produced using the above procedure can be altered by altering the amount of glycols distilled over.

The terephthalate ester polyols of this invention can be employed to produce foams using either the one-shot technique or the pre-polymer approach. A typical polyurethane foam composition employing a terephthalate ester polyol of this invention will have the following composition.

| Material | Parts per 100 Parts By Weight |
| --- | --- |
| "A" Component | |
| isocyanate | employed in an amount such that the total isocyanate to hydroxyl equivalent index is about .9 to 1.3. Preferably, the isocyanate to hydroxyl equivalent index is about 1.05 to about 1.15 |
| "B" Component | Range |
| terephthalate ester polyol | 4–94 |
| additional polyols | 0–90 |
| surfactant | 0–1 |
| catalyst | 0.5–2 |
| blowing agent | 4–28 |
| TOTAL | 100 |

In the production of a polyurethane foam of this invention, any suitable isocyanate or reactive —NCO containing compound can be employed. Prepolymers having reactive isocyanate or —NCO groups can also be employed. A particularly suitable isocyanate is designated Mondur MR, commercially available from Mobay Chemical Co., Pittsburgh, Pa. Mondur MR is a polymeric polyaryl-polyisocyanate prepared by phosgenation of aniline and formaldehyde in a mineral acid, the polyisocyanate having from about 31.5 to about 32% active —NCO groups and a Brookfield viscosity at 25° C of about 200 cps. Particularly suitable additional or blending polyols are designated Pluracol PeP 450 and Pluracol PeP 550 both available from BASF Wyandotte Corp., Wyandotte, Michigan, and Fyrol 6, a fire-retardant polyol commercially available from Stauffer Chemical Co., New York, N.Y.

Pluracol PeP 450 is the oxyalkylated reaction product of about 1 mole of pentaerythritol and about 4.5 moles of propylene oxide. It has a hydroxyl number of about 560, a number average molecular weight of about 400 and a Brookfield viscosity at 25° C of about 2500 cps.

Pluracol PeP 550 is the oxyalkylated reaction product of about 1 mole of pentaerythritol and about 6 moles of propylene oxide. It has a hydroxyl number of about 448, a number average molecular weight of about 500 and a Brookfield viscosity at 25° C of about 1400 cps.

Fyrol 6 is a phosphonate ester having the following structure:

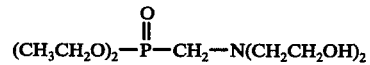

Any suitable surfactant can be employed in the polyurethane foams of this invention. A particularly suitable surfactant is designated L-5420. L-5420 surfactant is a nonhydrolyzable silicone surfactant which has a hydroxyl number of about 119 and a viscosity of 310 cs. L-5420 is commercially available from Union Carbide Corp., New York, N.Y.

Catalysts are commonly used to increase the rate of the isocyanate-polyol reaction. Particularly suitable catalysts are dimethylethanolamine and a 33% solution of 1,4-diazobicyclo(2,2,2) octane in dipropylene glycol which is designated Dabco 33-LV, commercially available from the Houdry Division of Air Products and Chemicals, Inc., Philadelphia, Pennsylvania.

Suitable blowing agents include water, the fluorochlorocarbons and hydrocarbons which boil in the range of from about —30° to about 50° C, for example, trichlorofluoromethane, trichlorofluoroethane, dichloromonofluoromethane, monochloroethane, monochloromonofluoroethane, difluoromonochloroethane, difluorodichloroethane, pentane and mixtures thereof. A particularly suitable blowing agent is designated Freon 11B, commercially available from E. I. du Pont de Nemours & Co., Wilmington, Delaware.

The following examples demonstrate the preparation of terephthalate ester polyols of this invention, polyurethane foams employing a terephthalate ester polyol and polyurethane foams which do not employ terephthalate ester polyols of this invention.

EXAMPLE I

A terephthalate ester polyol of this invention was prepared from the following materials.

| Materials | Moles |
| --- | --- |
| mixture of glycols, monomers and oligomers | 1 |
| glycerin | 1.1 |
| magnesium acetate | $2 \times 10^{-3}$ |

The total amounts of the mixture, the glycerin and the magnesium acetate were added to the reactor at room temperature. The contents of the reactor were then heated with constant agitation using a continuous nitrogen sparge. The temperature of the contents of the reactor was raised to about 170° C, and a vacuum of 25 inches Hg was applied and distillation of free glycols began. The distillation of free glycols was complete at a temperature of about 210° C. The resulting product in the reactor was permitted to cool to room temperature and recovered as a terephthalate ester polyol of this invention. The resulting polyol was found to have a hydroxyl number of 365 and a viscosity (measured on a Brookfield RVT model viscometer with an RV no. 7 spindle and a speed of 4 RPM) at 25° C of 404,000 cps.

A typical mixture of glycols, monomers and oligomers used in this example, and in the following examples, was obtained from Eastman Chemical Products, Inc., Kingsport, Tennessee, and had the following analyses:

| Component | Weight Percent (± 2%) Range |
|---|---|
| ethylne glycol | 8 |
| diethylene glycol | 6 |
| triethylene glycol | 3 |
| tetraethylene glycol | 0 |
| ethylene glycol monomer | 14 |
| diethylene glycol monomer | 6 |
| mixed monomers | 13 |
| oligomers | 50 |

The mixture was determined to have number average molecular weight peaks, as measured by gel permeation chromatography, at 188 and 513, a saponification number range of from about 219 to about 316 and a hydroxyl number of about 389.

EXAMPLE II

This example demonstrates the preparation of a terephthalate ester polyol of this invention using substantially the same procedure employed in Example I.

| Materials | Moles |
|---|---|
| mixtures of glycols, monomers and oligomers | 1 |
| pentaerythritol | 1 |
| magnesium acetate | $2 \times 10^{-3}$ |

The resulting terephthalate ester polyol was found to have a hydroxyl number of 420 and a viscosity (measured on a Brookfield RVT model viscometer with an RV no. 7 spindle and a speed of 0.5 RPM) at 25° C of 7,500,000 cps.

EXAMPLE III

This example demonstrates the preparation of a terephthalate ester polyol using substantially the same procedure employed in Example I.

| Materials | Moles |
|---|---|
| mixture of glycols, monomers and oligomers | 1 |
| oxyalkylated trimethylolpropane | 1.45 |
| magnesium acetate | $2 \times 10^{-3}$ |

The oxyalkylated trimethylolpropane employed was TP-340, commercially available from BASF Wyandotte, Corp., Wyandotte, Michigan. TP-340 has a hydroxyl number of about 560, a number average molecular weight of 300 and a Brookfield viscosity of 25° C of 900 cps.

The resulting terephthalate ester polyol was found to have a hydroxyl number of 325 and a viscosity (measured on a Brookfield RVT model viscometer with an RV no. 7 spindle and a speed of 100 RPM) at 25° C of 17,750 cps.

EXAMPLE IV

This example demonstrates the employment of the terephthalate ester polyol of Example I in a polyurethane foam of this invention.

| Materials | Parts per 100 Parts By Weight |
|---|---|
| "A" Component | |
| Mondur MR | 94 |
| "B" Component | |
| Polyol of Example I | 40 |
| Pluracol PeP 450 | 16 |
| Pluracol PeP 550 | 20 |
| L-5420 | 1 |
| Dimethylethanolamine | 0.5 |
| Freon 11B | 22 |
| Water | 0.5 |
| TOTAL | 100 |
| -NCO/-OH Index | 1.1/1 |

All the above materials except the Mondur MR were mixed in a mixing vessel at room temperature with agitation. Next, the total amount of Mondur MR was added to the mixing vessel while vigorously stirring with a high speed air stirrer. Stirring was continued for about 15 seconds. The resulting product, a prefoam, was immediately poured into a mold and allowed to rise fully. The resulting product was recovered as a rigid polyurethane foam bun and allowed to cure for about 1 week at 25° C.

The ratio of Pluracol PeP 450 to Pluracol PeP 550 employed to produce the foam of this example and the foams of the following examples was varied in order to maintain a ratio of 94 parts by weight "A" component to 100 parts by weight "B" component at an —NCO/—OH Index of 1.1/1.

EXAMPLE V

This example demonstrates the employment of the terephthalate ester polyol of Example I in a polyurethane foam of this invention.

| Materials | Parts per 100 Parts By Weight |
|---|---|
| "A" Component | |
| Mondur MR | 94 |
| "B" Component | |
| Polyol of Example I | 40 |
| Pluracol PeP 450 | 16 |
| Pluracol PeP 550 | 10 |
| Fyrol 6 | 10 |
| L-5420 | 1 |
| Dimethylethanolamine | 0.5 |
| Freon 11B | 22 |
| Water | 0.5 |
| TOTAL | 100 |
| -NCO/-OH Index | 1.1/1 |

A rigid polyurethane foam bun was prepared following the procedure of Example IV.

EXAMPLE VI

This example demonstrates the employment of the terephthalate ester polyol of Example II in a polyurethane foam of this invention.

| Materials | Parts per 100 Parts By Weight |
|---|---|
| "A" Component | |
| Mondur MR | 94 |
| "B" Component | |

-continued

| Materials | Parts per 100 Parts By Weight |
|---|---|
| Polyol of Example II | 40 |
| Pluracol PeP 450 | 16 |
| Pluracol PeP 550 | 20 |
| L-5420 | 1 |
| Dimethylethanolamine | 0.5 |
| Freon 11B | 22 |
| Water | 0.5 |
| TOTAL | 100 |
| -NCO/-OH Index | 1.1/1 |

A rigid polyurethane foam bun was prepared following the procedure of Example IV.

EXAMPLE VII

This example demonstrates the employment of the terephthalate ester polyol of Example III in a polyurethane foam of this invention.

| Materials | Parts per 100 Parts By Weight |
|---|---|
| "A" Component | |
| Mondur MR | 94 |
| "B" Component | |
| Polyol of Example III | 40 |
| Pluracol PeP 450 | 29 |
| Pluracol PeP 550 | 7 |
| L-5420 | 1 |
| Dimethylethanolamine | 0.5 |
| Freon 11B | 22 |
| Water | 0.5 |
| TOTAL | 100 |
| -NCO/-OH Index | 1.1/1 |

A rigid polyurethane foam bun was prepared following the procedure of Example IV.

EXAMPLE VIII

This example demonstrates the preparation of a polyurethane foam that does not employ a terephthalate ester polyol of this invention. By comparing the flame properties of the foam of this example with the flame properties of the foams of Examples IV, V, VI and VII (see Example X, Table I), it is apparent that polyurethane foams which employ a terephthalate ester polyol of this invention exhibit better flame properties than foams which do not.

| Materials | Parts per 100 Parts By Weight |
|---|---|
| "A" Component | |
| Mondur MR | 94 |
| "B" Component | |
| Multranol 4030 polyol | 40 |
| Pluracol PeP 450 | 11.5 |
| Pluracol PeP 550 | 24.0 |
| L-5420 | 0.5 |
| Dabco 33-LV | 1.5 |
| Freon 11B | 22 |
| Water | 0.5 |
| TOTAL | 100 |
| -NCO/-OH Index | 1.1/1 |

A rigid polyurethane foam bun was prepared following the procedure of Example IV.

Multranol 4030 is a sucrose-based polyol having a hydroxyl number of about 380 and a Brookfield viscosity at 25° C of about 13,000. Multranol 4030 is commercially available from Mobay Chemical Co., Pittsburgh, Pa.

EXAMPLE IX

This example demonstrates the preparation of a polyurethane foam that does not employ a terephthalate ester polyol of this invention. By comparing the flame properties of the foam of this example with the flame properties of the foams of Examples IV, V, VI and VII (see Example X, Table I), it is apparent that polyurethane foams which employ a terephthalate ester polyol of this invention exhibit better flame properties than foams which do not.

| Materials | Parts per 100 Parts By Weight |
|---|---|
| "A" Component | |
| Mondur MR | 94 |
| "B" Component | |
| Niax BE-375 | 40 |
| Pluracol PeP 450 | 13.5 |
| Pluracol Pep 550 | 22.0 |
| L-5420 | 0.5 |
| Dabco 33-LV | 1.5 |
| Freon 11B | 22 |
| Water | 0.5 |
| TOTAL | 100 |
| -NCO/-OH Index | 1.1/1 |

A rigid polyurethane foam bun was prepared following the procedure of Example IV.

Niax BE-375 Polyol is an aromatic polyol with a hydroxyl number of about 375 and is commercially available from Union Carbide Corp., New York, N. Y.

EXAMPLE X

The following Table I illustrates the flame properties of the rigid polyurethane foams of Examples IV, V, VI, VII, VIII, and IX. The foams in Table I are identified by the Example number in which they were demonstrated.

TABLE I

| Foam of Example Number: | FOAMS IV | V | VI | VII | VIII | IX |
|---|---|---|---|---|---|---|
| Butler Chimney Test[1] | | | | | | |
| (a) % Weight Retention | 71 | 84 | 67 | 62 | 25 | 38 |
| (b) Seconds to Extinguish | 9.7 | 0 | 7.0 | 11.0 | 21.5 | 19.5 |
| (c) Burn Zone | D+ | C− | D+ | D+ | D+ | D+ |
| Humidity Aging Volume Change[2] | | | | | | |
| - after 1 day, % | 4.4 | 4.7 | — | — | 6.9 | 5.9 |
| - after 14 days, % | 9.3 | — | 11.6 | 10.9 | — | — |
| Foam Density[3] (PCF) | 2.00 | 1.94 | 2.10 | 2.05 | 2.07 | 2.02 |
| ASTM E-84-76[4] | | | | | | |
| (a) Flame Spread | 43 | 39 | — | — | — | — |
| (b) Fuel Contributed | 5 | 0 | — | — | — | — |

TABLE I-continued

| Foam of Example Number: | FOAMS | | | | | |
|---|---|---|---|---|---|---|
| | IV | V | VI | VII | VIII | IX |
| (c) Smoke Developed | 93 | 107 | — | — | — | — |

[1] Journal of Cellular Plastics, volume 3 [number 11] pp 497–501 [1967].
[2] At 150° F and 100% relative humidity; ASTM D-2126-66 procedure F.
[3] ASTM D-1622-63
[4] 1976 revised ASTM E-84; standard 10 min. flame test at 1 inch thickness.

The above data show that the foams of Examples IV, V, VI and VII, which foams all employed a terephthalate ester polyol of this invention, achieved better flame properties than the foams of Examples VIII and IX, which foams did not employ a terephthalate ester polyol.

The foams of Examples IV, VI and VII achieved improved flame properties without the use of fire retardants.

The foam property data of Example V show that fire retardants (Example V employed a fire-retardant polyol) can be employed to optimize the flame properties of foams produced with a terephthalate ester polyol.

Accordingly, the above data serve to show that the present invention provides polyurethane foams having improved flame properties which properties are obtained by employing a terephthalate ester polyol of this invention.

It is evident from the foregoing that various modifications can be made to this invention. Such modifications are considered as being within the scope of this invention.

What is claim is:

1. A terephthalate ester polyol comprising the reaction product of a mixture of glycols, monomers and oligomers and a polyhydric alcohol in which said oligomers have the formula

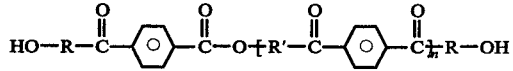

wherein $m$ has a value within the range of from 1 to 3, R represents the group $-\!\!+\!\!CH_2CH_2O\}_{\overline{n}}$ and n has a value within the range of from 0 to 4 and $R^1$ represents the group $-\!\!+\!\!CH_2CH_2-O\}_{\overline{x}}$ and x has a value within the range of from 1 to 4 and in which said monomers have the formula

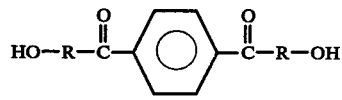

wherein R is as defined above.

2. The terephthalate ester polyol of claim 1 in which said polyol has an average hydroxyl functionality greater than two.

3. The terephthalate ester polyol of claim 1 in which said polyhydric alcohol is selected from a group consisting of glycerin, trimethylolpropane, triethanolamine, pentaerythritol, oxyalkylated glycerine, oxyalkylated trimethylolpropane, oxyalkylated triethanolamine and oxyalkylated pentaerythritol.

4. The terephthalate ester polyol of claim 1 in which said polyhydric alcohol is present in an amount within a range of from about 4 to about 1 moles of polyhydric alcohol to about 1 to about 4 moles of said mixture of glycols, monomers and oligomers.

* * * * *